United States Patent [19]
Evans et al.

[11] Patent Number: 5,223,555
[45] Date of Patent: Jun. 29, 1993

[54] CURABLE SILICONE COMPOSITION CONTAINING A FLUROSILICONE TREATED SILICA FILLER

[75] Inventors: Edwin R. Evans; Kevin T. Pate, both of Clifton Park; Jerome E. Rattner, Troy, all of N.Y.; Verne G. Simpson, Rogers, Ark.

[73] Assignee: General Electric Company, Waterford, N.Y.

[21] Appl. No.: 755,130

[22] Filed: Jul. 15, 1985

Related U.S. Application Data

[63] Continuation of Ser. No. 410,004, Aug. 20, 1982, Pat. No. 4,529,774.

[51] Int. Cl.$^5$ ............................................. C08K 9/00
[52] U.S. Cl. ..................................... 523/209; 523/213
[58] Field of Search ................................ 523/209, 213

[56] References Cited

U.S. PATENT DOCUMENTS

| | | | |
|---|---|---|---|
| 2,938,009 | 5/1960 | Lucas | 523/212 |
| 3,024,126 | 3/1962 | Brown | 523/212 |
| 3,122,516 | 2/1964 | Polmanteer | 524/731 |
| 3,847,848 | 11/1974 | Beers | 523/213 |
| 4,029,629 | 6/1977 | Jeram | 523/203 |
| 4,386,170 | 5/1983 | Monroe | 523/213 |
| 4,418,165 | 11/1983 | Polmanteer et al. | 523/209 |
| 4,500,659 | 2/1985 | Kroupa et al. | 523/213 |
| 4,529,774 | 7/1985 | Evans et al. | |

*Primary Examiner*—Melvyn I. Marquis

[57] ABSTRACT

A treatment for finely divided silica reinforcing fillers is provided which comprises heating the silica filler in the presence of a fluoroalkyl-functional diorganopolysiloxane. The treated fillers are especially compatible with fluorosilicone gums, and fluorosilicone rubbers made using said fillers exhibit improved mechanical properties, especially tear strength and compression set.

11 Claims, No Drawings

CURABLE SILICONE COMPOSITION CONTAINING A FLUROSILICONE TREATED SILICA FILLER

This application is a continuation of application Ser. No. 410,004, filed Aug. 20, 1982, U.S. Pat. No. 4,529,774.

BACKGROUND OF THE INVENTION

This invention relates to reinforced silicone elastomers. More particularly, it relates to finely divided silica fillers, useful in reinforcing fluorosilicone elastomeric compositions, which have been treated with pre-hydrolyzed fluorosilicones. Fluorosilicone elastomers containing silica fillers so treated show substantially improved compression set and tear strength, as well as improved handling properties.

Silicone elastomers have been widely valued for their resistance to moisture and their high and low temperature stability. Improved silicone elastomers have also been developed which exhibit better handling characteristics, as in U.S. Pat. No. 2,938,009 (Lucas), mechanical properties, as in U.S. Pat. No. 3,635,743 (Smith) and U.S. Pat. No. 3,847,848 (Beers), and solvent resistance, as in U.S. Pat. No. 4,029,629 (Jeram). All of the above patents are incorporated herein by reference. These improvements are accomplished through the use of treated fillers, usually treated finely divided silica, or by modifying the curable siloxane polymers, as with the perfluoroalkylene-substituted polysiloxanes of the aforementioned Jeram patent.

Treating silica fillers with fluorosilicone treating agents has been proposed, see e.g., copending U.S. applications Ser. No. 252,659 filed Apr. 9, 1981 now U.S. Pat. No. 4,355,121 and Ser. No. 368,931 filed Apr. 16, 1982, now U.S. Pat. No. 4,469,522, a continuation of 195,579 filed Nov. 8, 1980, abandoned, but implementation of the concept has been resisted because of the toxicity of the treating agents (i.e., fluoroalkyl functional cyclic polysiloxanes) and the substantial modifications of existing equipment their use would entail.

It has now been discovered that finely divided silica reinforcing fillers can be treated with fluoroalkyl-functional silicone polymers without modifying conventional production apparatus and without adding costly toxicity controls. Furthermore, fluorosilicone elastomers reinforced with these fillers show improved ease of handling in mixing, milling and extrusion and also have improved mechanical properties, especially in terms of tear strength and compression set.

SUMMARY OF THE INVENTION

Accordingly, it is the object of the present invention to provide a treated silica filler for reinforcing vulcanizable elastomers which will improve the handling properties and mechanical properties of silicone elastomers made with said fillers.

It is a further object of the present invention to provide a means of improving the performance of silicone rubbers without entailing significant product process changes or toxicity precautions.

It is a further object of the present invention to provide a process for treating finely divided silica reinforcing fillers with fluorosilicone treating agents.

These and other objects are accomplished herein by a process for treating finely divided silica fillers comprising contacting the filler, at a temperature of from 240°–310° C. for 4–16 hours while purging volatiles and water and maintaining a pressure of from 0 to about 15 psig, with a fluoroalkyl-functional diorganopolysiloxane treating agent, such as the hydrolyzate of a fluoroalkyl-functional cyclic polysiloxane.

Preferred features will include preheating of the filler before contact with the treating agent.

The treated filler and curable fluorosilicone elastomeric compositions containing the fillers are also contemplated herein.

DETAILED DESCRIPTION OF THE INVENTION

The fillers treated by the process of the present invention are finely divided reinforcing fillers which may have free hydroxyl groups in the form of either Si-bonded functional groups or adsorbed moisture, depending on their method of preparation. The Si-bonded hydroxyl groups may also have been converted to other functional groups, such as alkoxy, in their manufacture.

These silica fillers are reinforcing fillers in contrast to other fillers of non-reinforcing, non-structure-forming type, such as titanium dioxide or calcium carbonate. Examples of such silica fillers may be found described in U.S. Pat. Nos. 2,451,137; 2,610,167 and 2,657,149, as well as French Patents 1,025,837 (issued 1953) and 1,090,566 (issued 1955). Such structure-causing fillers may be slightly acidic or alkaline (i.e., have pH's slightly below or above 7) depending upon the method of manufacture, and may be obtained through the aerosol-aerogel process, by fuming processes such as by the vapor phase burning of silicon tetrachloride or ethyl silicate, by precipitation means, etc. Commercially available fumed silicas include CAB-O-SIL ® (Cabot Corp.) and AEROSIL ® (Degussa, Inc.). Fumed silica is preferred.

The treating agents used in the practice of this invention are fluoroalkyl-functional polysiloxane fluids having a viscosity of from about 50–250 centipoise which may be formed from cyclic polysiloxane monomers that have been hydrolyzed to form a mixture of cyclics and short diorganopolysiloxane chains. The cyclic polysiloxane entities will have from 3–9 siloxy units, some of the larger ring structures arising from reformation of cyclic monomer starting materials; the linear entities will have varying block lengths, with the average degree of polymerization being about 5. They are typically fluid polymers having a low molecular weight, usually under 1000. The cyclic polysiloxane starting materials are well known in the silicone elastomer art and are composed of from 3 to 8 siloxy units having the formula $RCH_2CH_2Si(Me)O$, where R is a perfluoroalkyl radical of from 1 to 10 carbons, such as $CF_3$, $C_2F_5$, $C_7F_{15}$ and $C_{10}F_{21}$. They may be prepared by methods disclosed in U.S. Pat. No. 2,979,519 (Pierce et al.) and U.S. Pat. No. 3,179,619 (Brown), which are incorporated herein by reference. The preferred starting compound is 3,3,3-trifluoropropylmethylsiloxane cyclic trimer, having the formula $(F_3CCH_2CH_2Si(Me)O)_3$.

Before they can be used in accordance with the present invention, the cyclic polysiloxanes must be hydrolyzed to form polymers. This is accomplished in a number of known ways using acid or base compounds to catalyze cleavage of the ring structure and polymerization. See, for example, U.S. Pat. No. 2,737,506 (Hurd et al.), U.S. Pat. No. 3,937,684 (Razzano) and U.S. Pat. No. 4,341,888 (Razzano), all incorporated by reference. The fluoroalkyl-functional diorganopolysiloxanes thus formed are low viscosity fluids which are easier and safer to work with than the cyclic monomers.

To obtain the treated silica fillers of the invention, the filler is heated in the presence of the fluoroalkyl-functional polysiloxane at a temperature of from 240°–310° C. for 4–16 hours, at 0–15 psig pressure, while removing liberated volatiles (e.g., water, cyclics). Preferably, the silica filler will be contacted with the fluorosilicone hydrolyzate over a temperature range of about 240° to about 260° C. for 4–8 hours at around one atmosphere (~14.7 psig) pressure while removing volatiles, for example, by nitrogen purge. The resultant treated fillers will have a broad particle size distribution (~73 wt. % <500μ; ~60 wt. % >420μ) and surface area over the range of 150–160 m²/gm. When these fillers are used to reinforce fluorosilicone polymer gums at levels, for example, of about 25–35 parts per 100 of the total composition, curable fluorosilicone elastomers result which (when cured) have improved mechanical properties (especially tear strength and compression set). Preparation and handling of the filled compositions is also easier: Mixing of filler with polymer is fast and a good dispersion is obtained; the composition also releases cleanly from metal mixing equipment.

Most preferably, the raw (untreated) silica filler will be preheated in a sealed system for 4–30 hours (more preferably 4–20 hours) at a temperature of 240°–310° C. (preferably about 270° C.), then contacted with the fluorosilicone hydrolyzate while maintaining a sealed, fluidized system, and heated 4–16 hours longer (more preferably 8–10 hours) at 270°–310° C. while maintaining one atmosphere gauge pressure. This results in treated filler with a somewhat narrower particle size distribution (~85 wt. % <500μ; ~70 Wt. % >420μ).

Preheating the silica filler in a closed system is believed to promote a reversible surface condensation which reduces the number of free hydroxyl groups on the surface of the silica particles. The condensation also increases particle size, leading to a loss of surface area (~149–160 m²/gm. as compared to 200–300 m²/gm. in untreated silica). The decreased surface area is believed to provide higher flourine content after treatment.

Prolonged preheating of the filler (e.g., >30 hours) results in particles which are too large, with insufficient hydroxyl functionality available for reaction with the treating agent. Treatment at pressures beyond about 15 psig or in a hydrous environment decreases the layering of fluorosilicone treating agent on the particle surface, which is a desirable characteristic of the treatment of the present invention. This decrease is believed to be due to some form of chain stopping.

The treated silica fillers prepared according to the present invention may be used in any heat- or room temperature-curable silicone rubber system or in any manner that finely divided silica fillers are commonly used in the art; but because the treated fillers disclosed herein have shown a compatability with fluorosilicone gums, leading to the unexpected processing improvements already discussed, use in fluorosilicone elastomer compositions, such as disclosed in U.S. Pat. No. 3,179,619 (Brown), U.S. Pat. No. 4,029,629 (Jeram) and U.S. application Ser. No. 443,545, filed Nov. 22, 1982, now U.S. Pat. No. 4,585,848, a continuation of U.S. application Ser. No. 253,282, filed Apr. 9, 1981 now abandoned (all incorporated by reference), is especially contemplated.

The amount of treated silica filler used in combination with curable (vulcanizable) organopolysiloxane elastomer compositions may be varied within wide limits, for instance, from 10 to 100 weight percent of the filler based on the weight of the curable organopolysiloxane elastomer. The exact amount of filler used will depend on such factors as, for example, the intended application of the cured elastomer composition, the density of the silica filler employed, the type or organopolysiloxane elastomer employed, etc. By way of illustration, when curable fluorosilicone polymer gums are used, reinforcing with about 19–25 weight percent of the treated filler disclosed herein has resulted in marked improvement in tear strength and compression set. Judicious selection of materials and simple experimentation is contemplated to achieve optimal performance for a given situation.

Other fillers may of course be used in conjunction with the treated silica fillers herein. These include, for example, untreated silica filler, titanium dioxide, lithopone, zinc oxide, zirconium silicate, iron oxide, diatomacious earth, finely divided sand, calcium carbonate, etc.

All patents and applications mentioned above are hereby incorporated by reference.

In order that persons skilled in the art may better understand how to practice the present invention, the following examples are offered by way of illustration and not by way of limitation.

EXAMPLES 1-5

Four treated silica filler compounds were prepared as follows:

| | COMPOSITION | | | |
|---|---|---|---|---|
| | 1 | 2 | 3 | 4 |
| silica filler* (lbs.) | 900 | 900 | 900 | 1000 |
| hydrolyzate** (lbs.) | 220 | 220 | 220 | 250 |
| weight percent charge | 19.6 | 19.6 | 19.6 | 20 |
| preheating at 270° C. (hrs.) | 20 | 4 | — | — |
| treating conditions | >270° C./ | >270° C./ | >270° C./ | 240° C./ |
| | 8 hrs. | 8 hrs. | 8 hrs. | 8 hrs. |
| pressure | 15 psig | 15 psig | 15 psig | 0 psig |
| | | PRODUCT | | |
| bulk density (gm./cc) | 0.089 | 0.095 | 0.118 | 0.25 |
| weight percent fluorosilicone | 17.32 | 16.84 | 15.89 | — |

*CAB-O-SIL ® MS-7; Cabot Corporation
**hydrolyzed 3,3,3-trifluoropropylmethylsiloxane cyclic trimer A fluorosilicone elastomer composition was prepared from 100 parts by weight fluorosilicone polymer, 3.0 parts by weight of a PDMS diol process aid: HO—(—Si(Me)₂O—)₅—H, 1.0 parts by weight of a PDMS process aid, 0.25 parts of (Me₂ViSi)₂NH, 0.65 parts by weight cerium hydroxide, and 0.8 parts by weight of 2,5-dimethyl-2,5-di-t-butylperoxyhexane. Treated filler compounds 1-4 were combined with the fluorosilicone elastomer compositions to make six test compositions. The six samples (designated A-F) were press cured fifteen minutes at 350° F. and post baked four hours at 400° F. to yield fluorosilicone rubbers with the following properties:

|  | TEST COMPOSITIONS | | | | | |
| --- | --- | --- | --- | --- | --- | --- |
|  | A | B | C | D | E | F |
| filler used | 1 | 1 | 2 | 3 | 4 | 4 |
| filler loading (parts per 100 of polymer) | 34 | 33 | 34 | 34 | 26 | 33 |
|  | RUBBER PROPERTIES | | | | | |
| Shore A | 43 | 39 | 41 | 43 | 36 | 46 |
| Tensile Strength (psi) | 1420 | 1205 | 1525 | 1505 | 1696 | 1130 |
| Elongation (%) | 610 | 650 | 620 | 600 | 640 | 520 |
| Tear Strength, Die B (ppi) | 210 | 200 | 180 | 210 | 190 | 170 |
| Bashore | 21 | 20 | 19 | 18 | — | 21 |
| Compression Set, 22 hours at 350° F. | 13.4 | 19.0 | 16.5 | 28.4 | 18.9 | 40.9 |
| Specif. Gravity | 1.424 | 1.417 | 1.422 | 1.426 | — | 1.415 |

Obviously, many variations will suggest themselves to those skilled in this art in light of the above, detailed description. All such modifications are within the intended scope of the appended claims.

We claim:

1. A heat curable or room temperature curable silicone composition containing reinforcing silica filler prepared by reacting untreated silica filler with a hydrolyzate comprising a mixture of fluoroalkyl-functional cyclic diorganopolysiloxanes having 3 to 10 siloxy units and silanol endstopped low molecular weight linear fluoroalkyl-functional diorganopolysiloxanes.

2. A curable silicone composition, comprising:
   (a) a polydiorganosiloxane,
   (b) an effective amount of curing catalyst, and
   (c) an effective amount of reinforcing filler prepared by heating an untreated silica filler in the presence of a mixture of fluoroalkyl-functional cyclic diorganopolysiloxanes having 3 to 10 siloxy units and silanol endstopped low molecular weight linear fluoroalkyl-functional diorganopolysiloxanes.

3. A curable composition as in claim 2, further comprising an effective amount of crosslinking agent.

4. An extrudable, curable silicone elastomer composition comprising a product obtained by mixing:
   (A) 100 parts by weight of a liquid triorganosiloxy-end-blocked polydimethylsiloxane wherein the triorganosiloxy units are dimethylvinylsiloxy or methylphenylvinylsiloxy and the polydimethylsiloxane exhibits a viscosity of from 1 to 200 Pa.s at 25° C.;
   (B) from 10 to 100 parts by weight based on the weight of (A) of a reinforcing silica filler having a surface area of at least 50 m$^2$/g, said filler having been reacted with a liquid or solubilized treating agent wherein at least a portion of said treating agent is a liquid, hydroxyl endblocked polyorganosiloxane wherein at least 50 percent of the silicon atoms are bonded to a fluorine-substituted hydrocarbon radical;
   (C) a liquid methylhydrogensiloxane in an amount sufficient to provide from 1 to 3 silicon-bonded hydrogen atoms per vinyl radical present in said curable elastomer composition, said methylhydrogensiloxane having an average of at least three silicon-bonded hydrogen atoms per molecule and consisting essentially of units selected from the group consisting of methylhydrogensiloxane, dimethylsiloxane, dimethylhydrogensiloxy, and SiO$_{4/2}$ units, the liquid methylhydrogensiloxane being mixed in the composition when platinum-containing catalyst is used as catalyst; and
   (D) a catalyst in sufficient amount to provide at least 0.1 part by weight of catalyst per million parts by weight of said triorganosiloxy endblocked polydimethylsiloxane.

5. An extrudable composition according to claim 4, where said fluorine-substituted hydrocarbon radical is a 3,3,3-trifluoropropyl radical.

6. An extrudable composition according to claim 4, where said liquid hydroxyl endblocked polyorganosiloxane is a hydroxyl endblocked poly(methyl-3,3,3-trifluoropropyl) siloxane exhibiting a viscosity of from 50 to 250 centipoise at 25° C.

7. An extrudable composition according to claim 4, where the total concentration of said treating agent is about 24 to 25 parts by weight per 100 parts by weight of silica.

8. An extrudable composition according to claim 4, where said reinforcing silica filler is of the precipitated or fumed type.

9. An extrudable composition according to claim 4, where said composition contains a platinum catalyst inhibitor in an amount sufficient to inhibit curing of said extrudable composition at temperatures below about 50° C.

10. The extrudable, curable silicone elastomer composition of claim 4 wherein the catalyst is a platinum catalyst.

11. The extrudable, curable silicone elastomer composition of claim 4 wherein the catalyst is 2,5-dimethyl-2,5-di-t-butylperoxyhexane.

* * * * *